United States Patent [19]

Kannabiran et al.

[11] Patent Number: 5,512,126
[45] Date of Patent: Apr. 30, 1996

[54] OPTICAL LAMINATOR

[75] Inventors: Rengan Kannabiran, Wayland; Leroy C. Vargas, New Bedford, both of Mass.

[73] Assignee: Polaroid Corporation, Cambridge, Mass.

[21] Appl. No.: 212,519

[22] Filed: Mar. 11, 1994

[51] Int. Cl.$^6$ ............................................. B32B 31/00
[52] U.S. Cl. ......................... 156/380.9; 156/272.2; 156/238; 156/239; 156/230; 156/324
[58] Field of Search .................. 156/380.9, 272.2, 156/238, 239, 230, 324

[56] References Cited

U.S. PATENT DOCUMENTS

| | | | |
|---|---|---|---|
| 2,757,711 | 8/1956 | Petry et al. | 154/20 |
| 2,958,367 | 11/1960 | Gournelle . | |
| 3,214,585 | 10/1965 | Stroszynski | 250/65 |
| 3,219,794 | 11/1965 | Mindell et al. | 219/216 |
| 3,383,265 | 5/1968 | Garabedian . | |
| 3,452,181 | 6/1969 | Stryjewski | 219/216 |
| 3,556,887 | 1/1971 | Adcock et al. | 156/272 |
| 3,574,031 | 4/1971 | Heller | 156/273 |
| 3,669,706 | 6/1972 | Sanders | 117/21 |
| 3,823,317 | 7/1974 | Ritzerfeld . | |
| 3,892,614 | 7/1975 | Levy | 156/272 |
| 3,924,533 | 12/1975 | Gaynor . | |
| 3,943,031 | 3/1976 | Krueger et al. | 156/583 |
| 3,989,367 | 11/1976 | Jackson et al. | 355/3 |
| 4,231,658 | 11/1980 | Zoecke | 355/110 |
| 4,470,858 | 9/1984 | McMaster | 156/103 |
| 4,472,491 | 9/1984 | Wiedemann | 430/58 |
| 4,477,299 | 10/1984 | Friedrich | 156/72 |
| 4,505,772 | 3/1985 | Renz | 156/355 |
| 4,617,080 | 10/1986 | Kobayashi et al. | 156/359 |
| 4,658,716 | 4/1987 | Boissevain | 100/38 |
| 4,740,816 | 4/1988 | Clements | 355/10 |
| 4,992,833 | 2/1991 | Dermiggio | 355/282 |
| 5,000,809 | 3/1991 | Adesko et al. | 156/230 |
| 5,021,293 | 6/1991 | Huang et al. | 428/328 |
| 5,074,019 | 12/1991 | Link | 29/116.2 |
| 5,203,756 | 4/1993 | Taguchi et al. | 492/16 |
| 5,278,023 | 1/1994 | Bills et al. | 430/201 |
| 5,282,919 | 2/1994 | Brooks . | |

FOREIGN PATENT DOCUMENTS

| | | |
|---|---|---|
| 0512267 | 11/1992 | European Pat. Off. . |
| 0589725 | 3/1994 | European Pat. Off. . |
| 084474 | 9/1971 | German Dem. Rep. . |
| 1779656 | 5/1972 | Germany . |
| 2809185 | 9/1979 | Germany . |
| 3925455 | 2/1991 | Germany . |
| 62-39038 | 8/1984 | Japan . |
| 63-260436 | 10/1988 | Japan . |
| 63-260437 | 10/1988 | Japan . |
| 9209930 | 11/1991 | WIPO . |

OTHER PUBLICATIONS

Patent Abstracts of Japan, vol. 17, No. 13 (E–1304), 11 Jan. 1993, based on JP,A,04 243363 (Iisutoman Kodatsuku Jiyapan DD), 31 Aug. 1992.

Primary Examiner—Chester T. Barry
Attorney, Agent, or Firm—Renato M. de Luna

[57] ABSTRACT

An apparatus and method for substantially interfacially adhering a suitable protective overcoat onto a receiving surface utilizes therein an optical lamination roller. The optical lamination roller is configured to be capable of substantially transmitting and concentrating optical radiation toward a protective overcoat. Irradiation of the protective overcoat in cooperation with compressive forces generated at the nip effectuate bonding between the protective overcoat and the receiving surface. The optical lamination system provides fast and energy efficient throughput with enhanced reliability of operation.

13 Claims, 8 Drawing Sheets

1

OPTICAL LAMINATOR

FIELD OF THE INVENTION

In general, the present invention relates to laminators, and more particularly, to optical lamination systems useful for substantially interfacially adhering a protective overcoat onto a receiving surface wherein the protective overcoat is capable of being made bondable to the receiving surface upon exposure to optical radiation, the optical radiation being transmitted through and concentrated by an optically transparent lamination roller.

BACKGROUND OF THE INVENTION

Oftentimes it will be advantageous that a certain surface, due to its fragility and/or environmental sensitivity, be secured with an appropriate protective coating or layer. In this regard, the application of a protective overcoat onto such a surface by means of lamination has become a favored practice. One surface that benefits from such lamination is an image surface of a thermal imaging medium, such as described in International Patent Application No. PCT/US87/03249 (Publication No. WO 88/04237) (Etzel), the image surface being formed after imagewise development of the medium's image-forming layer.

More particularly, International Patent Application No. PCT/US87/03249 describes a thermal imaging medium and a process for forming an image in which a layer of a porous or particulate imaging material (preferably, a layer of carbon black) is deposited on a heat-activatable image-forming surface of a first sheet-like element, the layer having a cohesive strength greater than its adhesive strength to the first sheet-like element. Portions of this thermal imaging medium are then exposed to brief and intense radiation (for example, laser scanning), to firmly attach exposed portions of the imaging material to the first sheet-like element. Finally, those portions of the imaging material not exposed to the radiation (and thus not firmly attached to the first sheet-like element) are removed, thereby forming a binary image surface comprising a plurality of first areas where the imaging material is adhered to the first sheet-like element and a plurality of second areas where the first sheet-like element is free from the imaging material.

In an embodiment of the thermal imaging medium described by International Patent Application No. PCT/US87/03249, the imaging material is covered with a second laminated sheet-like element so that the imaging material is confined between the first element and this second element. After imaging and separation of the second element (with the unexposed portions of the imaging material) from the first element, a pair of image surfaces is obtained. The first image surface comprises exposed portions of image-forming substance more firmly attached to the first element by heat activation of the heat-activatable image-forming surface. The second image surface comprises non-exposed portions of the image-forming substance carried or transferred to the second sheet element. Either of the pair of image surfaces may, for reasons of informational content, aesthetic or otherwise, be desirably considered the principal image surface, and all of the following discussion is applicable to both types of image surface.

While the image-forming process described in International Patent Application No. PCT/US87/03249 is capable of producing high quality, high resolution images, the durability of the image surfaces produced by this process may be inappropriate for certain desired applications. In the finished image surface, the porous or particulate imaging material, typically carbon black admixed with a binder, lies exposed (unprotected). The image may, thus, be vulnerable to being smeared, damaged or removed by, for example, fingers or skin surfaces (especially if moist), solvents or friction during manual or other handling of the image.

In consideration of its unprotected condition it may be desirable to protect the image surface of the developed thermal imaging medium by the application of a protective overcoat, such as a thin, transparent, but durable radiation (for example, laser scanning), to firmly attach exposed portions of the imaging material to the first sheet-like element. Finally, those portions of the imaging material not exposed to the radiation (and thus not firmly attached to the first sheet-like element) are removed, thereby forming a binary image surface comprising a plurality of first areas where the imaging material is adhered to the first sheet-like element and a plurality of second areas where the first sheet-like element is free from the imaging material.

In an embodiment of the thermal imaging medium described by International Patent Application No. PCT/US87/03249, the imaging material is covered with a second laminated sheet-like element so that the imaging material is confined between the first element and this second element. After imaging and separation of the second element (with the unexposed portions of the imaging material) from the first element, a pair of image surfaces is obtained. The first image surface comprises exposed portions of image-forming substance more firmly attached to the first element by heat activation of the heat-activatable image-forming surface. The second image surface comprises non-exposed portions of the image-forming substance carried or transferred to the second sheet element. Either of the pair of image surfaces may, for reasons of informational content, aesthetic or otherwise, be desirably considered the principal image surface, and all of the following discussion is applicable to both types of image surface.

While the image-forming process described in International Patent Application No. PCT/US87/03249 is capable of producing high quality, high resolution images, the durability of the image surfaces produced by this process may be inappropriate for certain desired applications. In the finished image surface, the porous or particulate imaging material, typically carbon black admixed with a binder, lies exposed (unprotected). The image may, thus, be vulnerable to being smeared, damaged or removed by, for example, fingers or skin surfaces (especially if moist), solvents or friction during manual or other handling of the image.

In consideration of its unprotected condition it may be desirable to protect the image surface of the developed thermal imaging medium by the application of a protective overcoat, such as a thin, transparent, but durable layer, such as described in International Patent Application No. PCT/US91/08345 (Publication No. WO 92/09930) (Fehervari et al.); and allowed U.S. Patent Application Ser. No. 08/065345 (Bloom et al.).

Lamination of protective overcoats, such as those described in the cited patent applications, has been accomplished using a continuous roll or carrier web to conduct the durable layer to the imaged sheets, the durable layer typically being associated with an adhesive layer. Fed through a nip existing between paired compression rollers, activation energy to fuse the durable layer to the imaged sheet is provided by thermal heating elements integrated into or with the paired compression rollers. Generally, the top roller is actively heated and the bottom roller allowed to reach a steady state temperature well above room temperature by conduction. Lamination is effected by the cooperative influences of both compression and thermal heating. While such method has provided good results, aspects intrinsic to such lamination techniques may become inconsistent for certain applications or when certain functionalities are desired. Some of such aspects may be noted.

First, it will be appreciated that heated compression rollers generally have considerable thermal mass. When energized (heated) from a cold start, a delay may be anticipated before such rollers reach a surface temperature adequate to conduct satisfactory lamination.

Further, since heat is transferred by conduction from a heated roller to the receiving surface of a web material, matter between the heated roller and the receiving surface is heated to at least the temperature attained at the receiving surface. This imposes substantial temperature restrictions when using a low Tg web material, such as polyester. Such material's thermoplastic nature compels comparatively precise control of post-nip material geometry to prevent undesirable web distortion.

Further, heat recovery rate characteristics of the roller used for heat transfer to the laminate may limit the rate at which lamination can be conducted if the web length passing through the nip is longer than the circumference of the heated roller. If full equilibration is not achieved, then conditions will change abruptly as the energy depleted portion of the roll surface begins the next cycle.

Further, for systems with large surface areas, heat loss by convection and radiation can become substantial. Heat loss requires provision of costly "make up" energy. Lost heat can also affect materials or electric components within the vicinity of the laminator over time.

Further, large physical structures once brought to thermal equilibrium present a problem if service to elements in their vicinity is required. Safety may be compromised when working on or near these heated components. The time required to cool to a safe level once power is cut can be substantial.

In light of the above, need exists for a laminating system useful for laminating a protective overcoat onto a receiving surface yet minimizing or obviating difficulties that manifest in certain lamination processes that utilize heated compression rollers.

SUMMARY OF THE INVENTION

In consideration of the above mentioned need, the present invention provides an optical lamination system useful for substantially interfacially adhering a suitable protective overcoat onto a receiving surface. The optical lamination system utilizes therein an optical lamination roller configured to be capable of substantially transmitting and concentrating optical radiation toward the protective overcoat preferably and substantially at a nip, the nip being formed between the optical lamination roller and a paired pressure roller or like-functioning resisting member or object. Irradiation of the protective overcoat in cooperation with compressive forces generated at the nip effectuate bonding between the protective overcoat and the receiving surface.

In light of the above, it is one object of the present invention to provide an optical lamination system utilizing an optical lamination roller whereby response time of the optical lamination system corresponds with the time constant of its primary energy source.

It is a further object of the present invention to provide an optical lamination system wherein protective overcoat material is transported contacting comparatively cool surfaces during lamination thereby reducing deformation in a resulting laminate.

It is a further object of the present invention to provide an optical lamination system whereby lamination may be conducted at rates generally dictated by processes in the nip region.

It is a further object of the present invention to provide an optical lamination system utilizing an optical lamination roller, the optical lamination roller having substantially equal energy transfer capacity over its entire circumference.

It is a further object of the present invention to provide an optical lamination system utilizing an optical lamination roller, the optical lamination roller having no appreciable memory effect.

It is another object of the present invention to provide an optical lamination system useful for substantially interfacially adhering a protective overcoat onto a receiving surface when the protective overcoat and receiving surface are continuously conveyed between an optical lamination roller and a source of resistance and wherein the protective overcoat is capable of being made bondable to the receiving surface upon irradiation with optical radiation, the optical laminator comprising an optical lamination roller positioned to establish a nip zone when brought into association with the resistance source, the optical lamination roller being axially rotatable and configured to transmit and concentrate optical radiation in the production of an activation zone; conveying means for effectuating the positioning of the protective overcoat into the nip zone in optical contiguity with the optical lamination roller; compressing means for generating a compressive force at the nip zone, the compressive force being of a magnitude sufficient to promote the adhering of the protective overcoat after exposure onto the receiving surface; and an optical radiation source capable of emitting optical radiation at an intensity sufficient to activate the protective overcoat when the optical radiation is transmitted and concentrated by the optical lamination roller; the optical radiation source capable of emitting optical radiation through the optical lamination roller.

It is another object of the present invention to provide an optical lamination process for substantially interfacially adhering a protective overcoat onto a receiving surface, the optical lamination process comprising the steps of providing a protective overcoat capable of being made bondable to the receiving surface upon irradiation with optical radiation; insertingly conveying a first region of the protective overcoat into substantial interfacial association with a first region of the receiving surface into a nip, the nip being established by an optical lamination roller brought into association with a resistance source, the optical lamination roller being axially rotatable and configured to transmit and concentrate optical radiation in the production of an activation zone; bonding the first region of the protective overcoat to the first region of the receiving surface by transmitting optical radiation through the optical lamination roller to irradiate the inserted first region of the protective overcoat, the transmission of the optical radiation establishing an activation zone on the protective overcoat wherein the protective overcoat becomes bondable to the receiving surface, and generating compressive force in the nip to pressurewise urge the protective overcoat onto the receiving surface; and repeating the conveying, compressing, and bonding steps until the protective overcoat is substantially interfacially adhered onto the receiving surface.

BRIEF DESCRIPTION OF THE DRAWINGS

Each of FIGS. 1 to 8 provide schematic views of an embodiment of the optical lamination system according to the present invention.

DETAILED DESCRIPTION OF THE INVENTION

The present invention provides an optical lamination system useful for substantially planewise adhering a protective overcoat onto a receiving surface, wherein the protective overcoat and receiving surface are continuously conveyed between the optical laminating system and a source of resistance and the protective overcoat is capable of being made bondable ("activated") to the receiving surface upon its irradiation with optical radiation. The optical lamination system has incorporated therein an optically transparent lamination roller (hereinafter, "optical lamination roller" or "optical roller"). The optical lamination roller is configured to be capable of substantially transmitting and concentrating optical radiation toward the protective overcoat for the production of an activation zone thereon. Irradiation of the protective overcoat in cooperation with compressive forces generated at the nip effectuate bonding between the protective overcoat and the receiving surface.

The term "optical radiation" as used herein should be construed with reference to electromagnetic radiation capable of being optically manipulated, i.e. manipulated by optical instruments such as lenses. Under one construct, the term "optical radiation" may be considered as analogous to the broader definition of "light" which includes visible, ultraviolet and infrared radiation. In any event, the scope of the term should be determined with reference to the functionality of the invention's various elements as described herein, particularly in view of the invention's background and objectives.

The term "activation zone" as used herein corresponds to the area of the protective overcoat that is irradiated by optical radiation and is thereby "activated". It will be appreciated that in appropriate protective overcoats, the zone of transmitted optical irradiation will effectuate chemical and/or physical changes to thereby make the protective overcoat bondable ("activated") to the receiving surface. Since the optical radiation transmitted through the optical lamination roller becomes concentrated by the roller, the activation zone produced by the present invention is comparatively narrow and intense.

It is envisioned that the optical lamination system may be incorporated into a wide variety of devices. In a principal application, the optical lamination system is incorporated in a laminator, one representative example being illustrated in FIG. 1. Although this embodiment will be used to describe the present invention, it will be appreciated that the invention is not limited to such embodiment, and that various changes and modifications can be effected therein by one skilled in the pertinent art in view of the present disclosure without departing from the scope or spirit of the invention, as defined in the claims.

Figure 1:
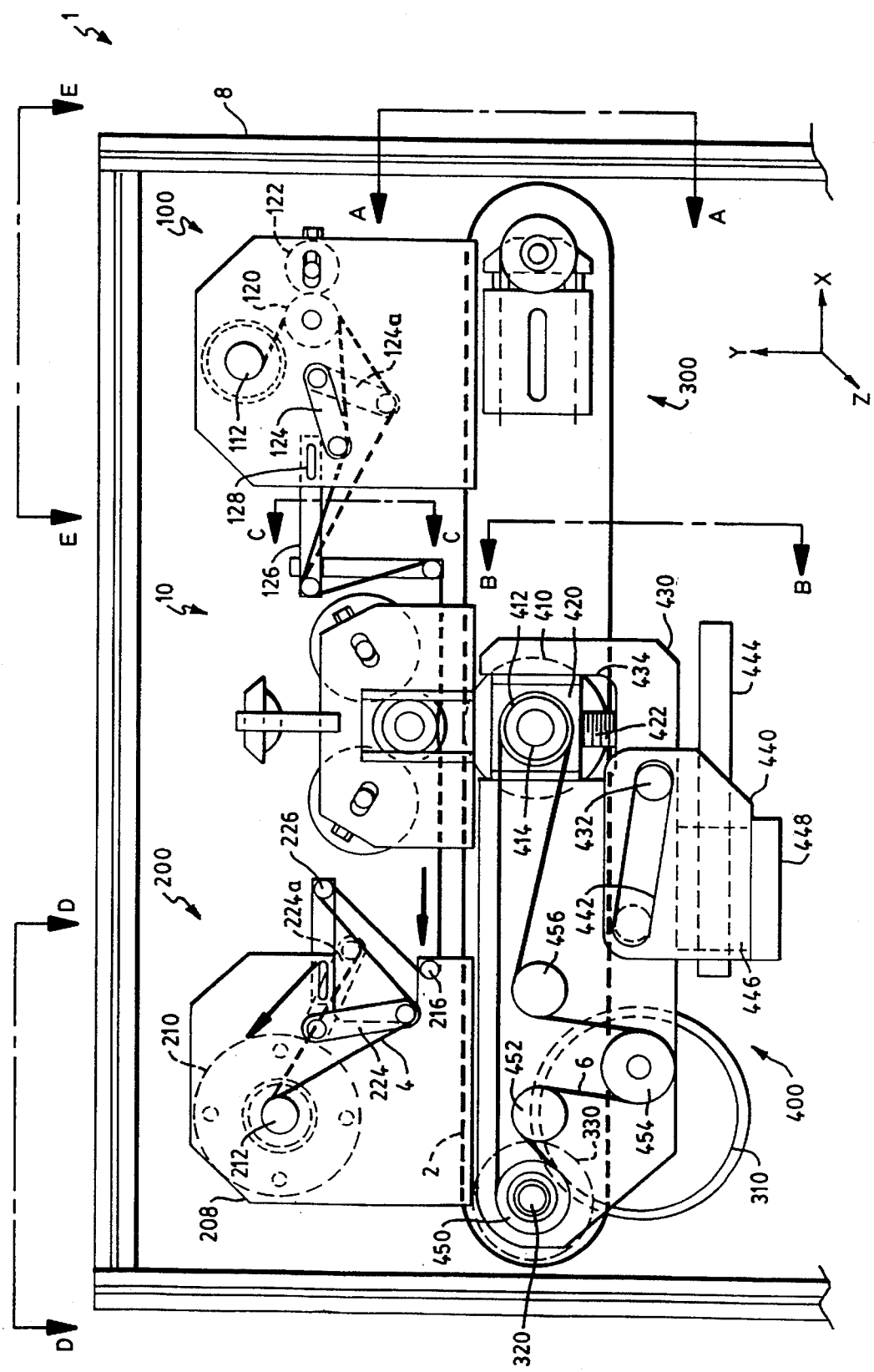
FIG. 1 is a lateral elevation illustrating a laminator having therein an optical lamination system configured according to an embodiment of the present invention.

As shown in FIG. 1, optical lamination system 10 is incorporated into laminator 1 together with supporting subassemblies. Accordingly, aside from optical lamination system 10, laminator 1 of FIGURE 1 is provided with a spool assembly 100, a take-up assembly 200, a resistant roller assembly 400, and a continuous belt assembly 300, the arrangement being housed in cabinet 8. For further clarity, a larger view of optical lamination system 10 in isolation from the other subassemblies of laminator 1 is provided in FIG. 3.

Figure 3:
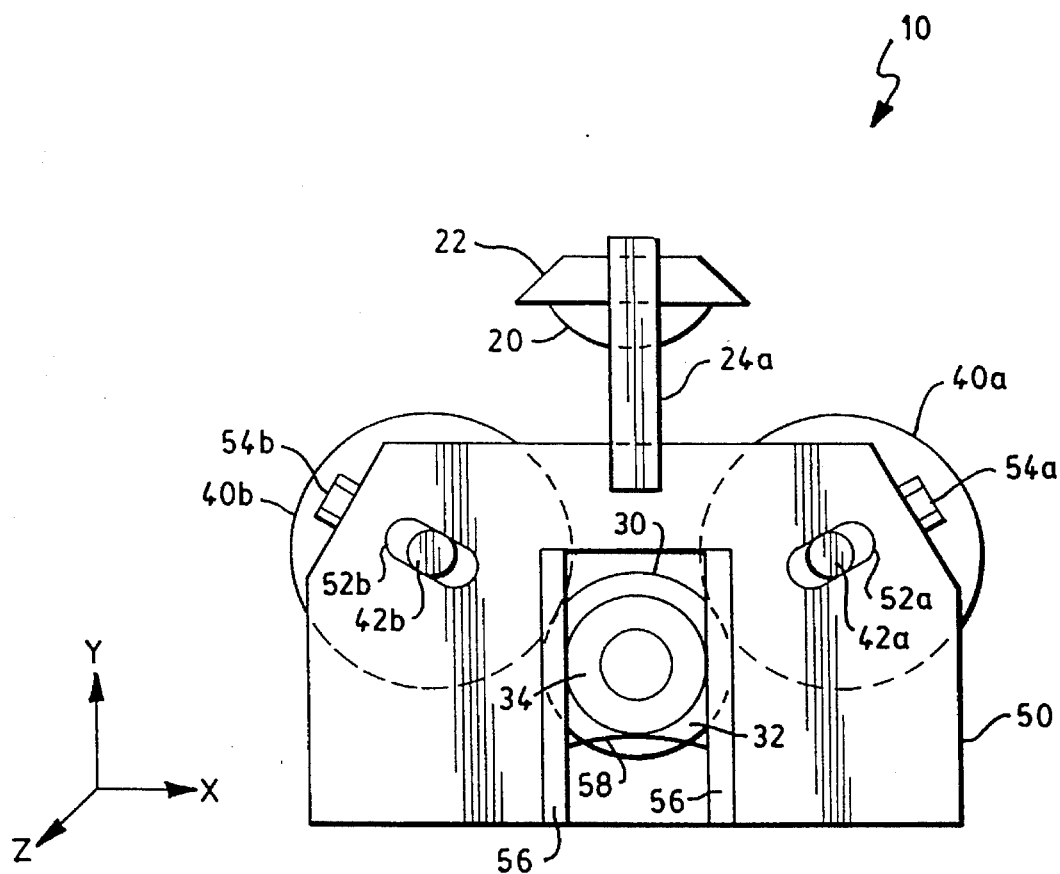
FIG. 3 provides a larger lateral view of the optical lamination system incorporated into the laminator illustrated in FIG. 1.

As shown in FIG. 3, optical lamination system 10 has provided therein an optical lamination roller 32 perpendicularly displaced from the lateral sides of housing 50 and rotatable around its axis. While optical lamination roller 32 may be fixed along its axis in certain applications, in operation, the optical lamination system 10 of FIG. 1 obtains benefit by providing optical lamination roller 32 with some degree of movement, generally in the plane in which compression is effectuated (i.e., the vertical plane in FIGS. 1 and 3). Such movement provides optical lamination roller 32 with a corresponding degree of resiliency and stress absorptive qualities which can promote more uniform linear compression during lamination. To provide for such movement, as shown in FIG. 1, the optical lamination roller 32 is provided with a track engaging mechanism 34 capable of engaging and riding on track guides 56 provided in housing 50. The degree of movement provided to optical lamination roller 32 by these or other means may be selected by one skilled in the art depending on the application and the device into which the optical lamination system 10 is incorporated. It is envisioned that in certain applications, the optical lamination roller 32 may be used as a primary means for achieving compressive pressure and would accordingly benefit from an extended degree of mobility.

In accord with the present invention, bonding of a protective overcoat onto a receiving surface is commenced by the activation of the protective overcoat, activation being occasioned by irradiation with optical radiation. In the embodiment represented by the optical lamination system 10 of FIG. 3, optical radiation is emitted by optical radiation source 20. Optical radiation source 20 is positioned externally and above optically transparent roller 32 such that optical radiation may be emitted directly at and through optically transparent roller 32. Further toward this end, optical radiation source 20 is provided with a reflector 22 to reflect light toward the direction of desired transmission as well as prevent the radiant heating of other parts of the laminator. In view of the present disclosure, it is envisioned that the use of mirrors, prisms, and the like would provide any person skilled in the pertinent art with other alternative positions for the optical radiation source 20 without substantially departing from the means, functions, and results obtained by the embodiment as illustrated.

Figure 4:
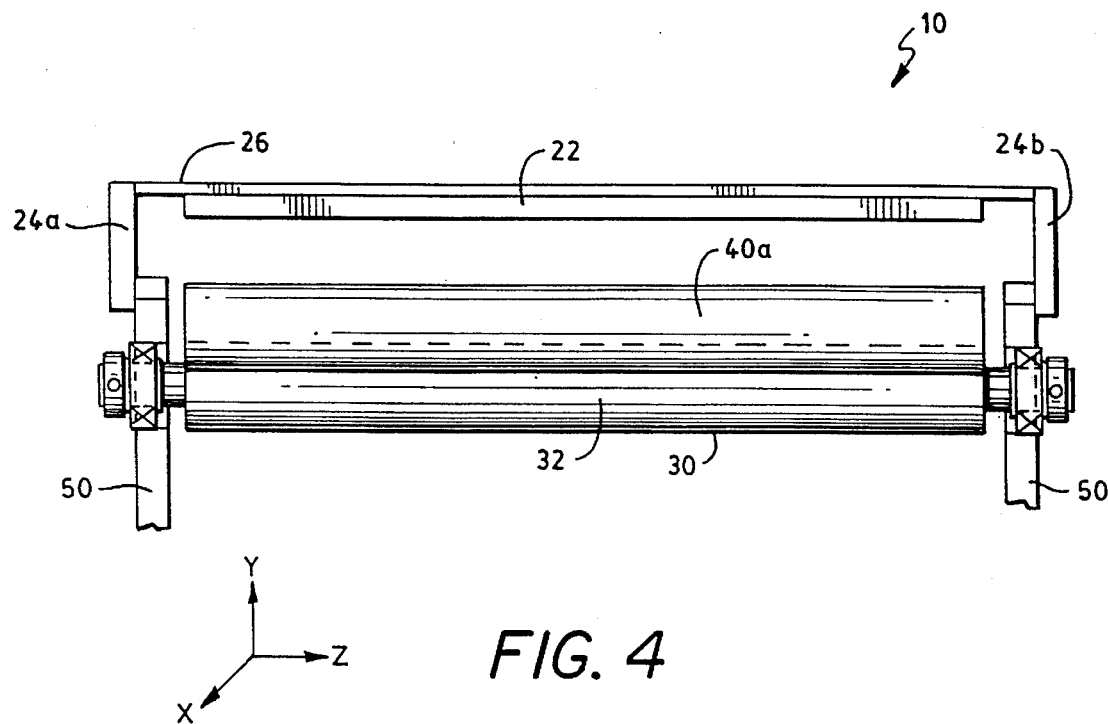
FIG. 4 is a rear lateral, partially cross-sectional view of the optical lamination system as incorporated into the laminator illustrated in FIG. 1 viewed along section C—C.

As shown in FIGS. 3 and 4, optical radiation source 20 is mounted to housing 50 by means of side support 24a, 24b and top support 26. In the embodiment illustrated, side supports 24a, 24b, and top support 26 are configured, or otherwise attached to housing 50, to permit both angular and vertical displacement of optical radiation source 20 relative to the location of optical lamination roller 32. By variably positioning the optical radiation source 20 in accordance with the known optical properties of cylindrical lenses, one may vary the intensity, area and/or the location of the activation zone relative to the nip. Details concerning the optical properties of cylindrical lenses may be found in several accessible references, for example, G. A. Boutry, *Instrumental Optics*, Interscience Publishers Inc., 1962, pp. 218–237; J. P. C. Southall, *Mirrors, Prisms and Lenses*, 3rd Ed., Dover Publications, Inc. 1964, pp. 300–328; and D. H. Jacobs, *Fundamentals of Optical Engineering*, MacCraw-Hill Book Company, 1943. In a preferred lamination technique, the optical radiation source is positioned so that the intensity of the activation zone is at peak at or immediately upstream from the nip. It is believed that in such arrangement, adhesive flow (i.e., in protective overcoats reliant on thermally activated adhesives) occurs in a manner that reduces curl in the resulting laminate.

Any number of optical radiation sources may be selected by one skilled in the art in view of a desired application, possible candidates would include incandescent light, infrared emitters, and ultraviolet emitters. For lamination processes involving the production of tack welds or stripes of bonded material, optical radiation point sources that may be considered would include diode lasers or arc lamps. In the embodiment described in detail herein, an infrared emitter is preferred.

When utilizing an infrared radiation source, optical lamination roller 32 may be constructed from any number of materials, including quartz, fused alumina, glass, or composite structures with an outer shell of durable material filled with a suitable inner core of optical material. When constructed of quartz, it will be appreciated that optical lamination roller 32 will absorb comparatively less infrared radiation, and thus promote higher transmission of such optical radiation toward the activation zone. Accordingly, in consideration of energy efficiency, optical lamination roller 32 is preferably made of quartz when optical radiation source 20 is an infrared radiation source. If desired, the surface of optical lamination roller 32 may be masked to produce very sharp edged exposure areas, for example, for applications which require light bonded tabs.

As will be appreciated from FIG. 1, the optical lamination roller 32 of optical lamination system 10 is positioned relative to, for example, a resisting compression roller 410 of resisting compression roller assembly 400 such that a nip is formed therebetween. By pressurewise urging resisting compression roller 410 toward optical lamination roller 32, compression roller assembly 400 is capable of actively providing a means by which compression is effectuated in the nip zone. Other means that would provide the same functionality may be used in substitute for the mechanisms described herein without departing from the spirit of the invention. For example, compression may be achieved by utilizing a flat plate or platen instead of a compression roller. Alternatively, optical lamination roller 32 may be configured so it may be pressurewise urged towards a fixed compression roller. Alternatively, optical lamination system 10 may be pushed in its entirety toward a solid surface, thereby producing both a nip and compressive force. In such alternative, the receiving surface itself passively provides the resistance against the forward movement of optical lamination system 10, cooperating to form compressive force.

In the embodiment described herein, the compressive functionality of the resisting compression roller 410 is supported by the combination of wedge plate 440 and pivoting support plate 430.

Figure 6:
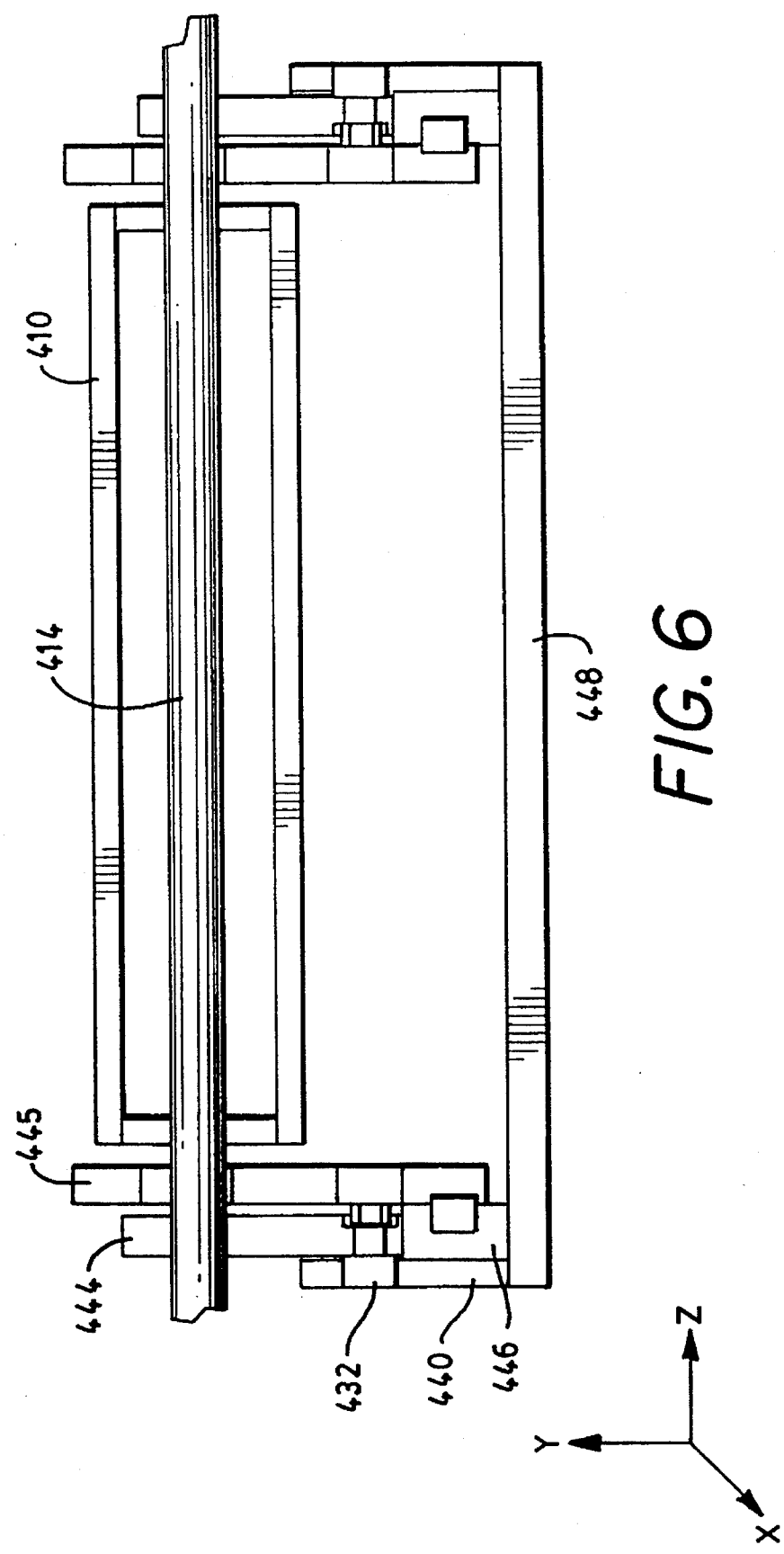
FIG. 6 is a rear lateral, partially cross-sectional view of a resisting compression roller as incorporated in the optical lamination system illustrated in FIG. 1 viewed along section B—B.

As shown in FIGS. 1, wedge plate 440 has provided thereon wedge plate guide 442. As shown in FIG. 6, wedge plate 440 is attached perpendicular to bottom cross-bar 448, cross-bar 448 having centrally thereon screw engagement block 446 (FIG. 2), block 446 having rotatably inserted therein screw member 444 (as actuated by vertical compression roller drive assembly 447). Rotation of screw member 444 results in either the forward or reverse movement of wedge plate 440 relative to pivoting support plate 430 (See directional arrow in FIG. 2).

Pivoting support plate 430, pivotable along axle 320, has therein provided cam follower 432 engaged with and movable along wedge plate guide 442. Resisting compression roller 410 is axially rotatably mounted on compression roller slide 420, slide 420 being slidably engaged in vertical roller guide 434 provided on pivotal support plate 430. Vertical displacement of resisting compression roller 410 toward or away from optical lamination roller 32 is effectuated by the movement of cam follower 432 along wedge plate guide 442 when wedge plate 440 is moved relative to pivoting support plate 430. In this regard, and with reference to FIG. 1, forward (or reverse) movement of wedge plate 440 results in the upward (or downward) vertical displacement of cam follower 432, which in turn results in the upward (or downward) actuated pivot of pivoting support plate 430, which in turn results in the substantially upward (or downward) vertical displacement of resisting compression roller 410 relative to optical lamination roller 32, and thereby effecting compression.

As illustrated in FIG. 1, resisting compression roller 410 is also indirectly associated (through its attachment with compression roller slide 420) with die spring 422. The arrangement resiliently urges resisting compression roller 410 toward the nip along the path defined by the vertical roller guide 434. While such mechanism allows some degree of compression, compressive force is primarily provided by the combinations associated with the aforementioned wedge plate 440 and pivoting support plate 430.

As illustrated in FIG. 1, a drive assembly for rotatably driving resisting compression roller 410 may comprise a series of grooved guide wheels 452, 454, and 456 having engaged therethrough drive belt 6. Apart from grooved guide wheels 452, 454, and 456, drive belt 6 is engaged with belt drive wheel 450 and belt engaging wheel 412 of resisting compression roller 410. Rotation of belt drive wheel 450 is effected by motor 310, a motor shared with continuous belt assembly 300. By the arrangement of wheels 452, 454, 456, 450, 412, and drive belt 6, rotation of belt drive wheel 450 will effectuate corresponding rotation of resisting compression roller 410.

In conducting lamination, it will be appreciated that compression, by whatever means selected, is desirably accomplished so that force is distributed uniformly in the intended area of compression. For example, if lamination is carried out under the condition of an uneven distribution of pressure, then the protective overcoat may not be uniformly bonded to the receiving surface; that is, the protective overcoat will not be sufficiently bonded to the part of the receiving surface where the pressure is lower. Further, the uneven distribution of pressure; i.e., a difference in pressure, may cause either the protective overcoat, the receiving surface, or both to meander, and the meandering of such may form wrinkles on the film. In addition to potential media related shortcomings, uneven compression can also contribute to possible mechanical failures. In laminators wherein compression is accomplished by paired opposing rollers, uneven compression will increase the likelihood that the paired rollers will skew relative to each other, thus either displacing or destroying the linearity of a nip existing therebetween. Skewing becomes more pronounced with the utilization of higher compressive forces. Lamination cannot be accomplished satisfactorily under such condition.

To assist in obtaining a uniform distribution of pressure and to reduce skewing (thereby allowing the use of greater compressive forces), optical lamination roller is provided with bracing means, an example of which is represented in the FIGURES as paired rollers 40a and 40b.

As shown in FIGS. 1, 3, and 4, optical lamination roller 32 is braced in the upward vertical direction by paired rollers 40a and 40b. Paired rollers 40a and 40b are arranged to frictionally abut along opposing corresponding sides of the upper half of optical lamination roller 32. Paired rollers 40a and 40b abut optical lamination roller 32 "frictionally", such that axial rotation of one of the rollers results in a responsive corresponding axial rotation of the other rollers. In this regard, paired rollers 40a and 40b are preferably provided with a rubber surface. The arrangement of the paired rollers 40a and 40b afford optical lamination roller 32 with the capacity to axially rotate while being continuously and uniformly braced. Such provides particular advantage to comparatively wider rollers which have a greater tendency to bend during compression. To maintain the frictional abutment of paired rollers 40a and 40b with optical lamination roller 32 while allowing some degree of vertical movement within guides 56, a leaf spring 58 is provided.

While equivalent bracing means can be selected and employed by one ordinarily skilled in the art, with particular regard to the means represented by paired rollers 40a and 40b, it may be noted that solidity of optical lamination roller 32 will provide advantage over hollow transparent rollers or drums. For certain lamination procedures utilizing compressive forces of comparatively large magnitude, hollow transparent rollers are to be disfavored for their tendency to shatter in such environment.

To further reduce the possibility of skewing, optical lamination roller 32 may be also provided with springs (not shown) engaging the distal ends of optical lamination roller 32 for the purpose of buttressing roller 32 in the horizontal plane. Suitable mechanisms may be added to reduce any interference with the axial rotation of optical lamination roller 32.

In accordance with the present invention, a protective overcoat and a receiving surface are conveyed through the nip where the protective overcoat is subjected to pressure and optically generated heat, the combination sufficient to cooperatively effectuate lamination onto the receiving surface. In the laminator illustrated in FIG. 1, the conveyance of the protective overcoat and the conveyance of the receiving surface are effectuated by distinct mechanical elements, i.e., a protective overcoat conveying means and a continuous belt assembly 300, respectively.

As illustrated in FIG. 1, the protective overcoat conveying means for conveying a protective overcoat borne on a carrier web to the nip comprises a spool assembly 100 and a take-up assembly 200. Spool assembly 100 is configured to releasably house a supply of the "cartier web-borne" (hereinafter, "web-borne") protective overcoat; take-up assembly 200 is configured to actively provide the driving force for transport of the protective overcoat from spool assembly 100 into the nip by actively capturing spent carrier web.

Figure 8:
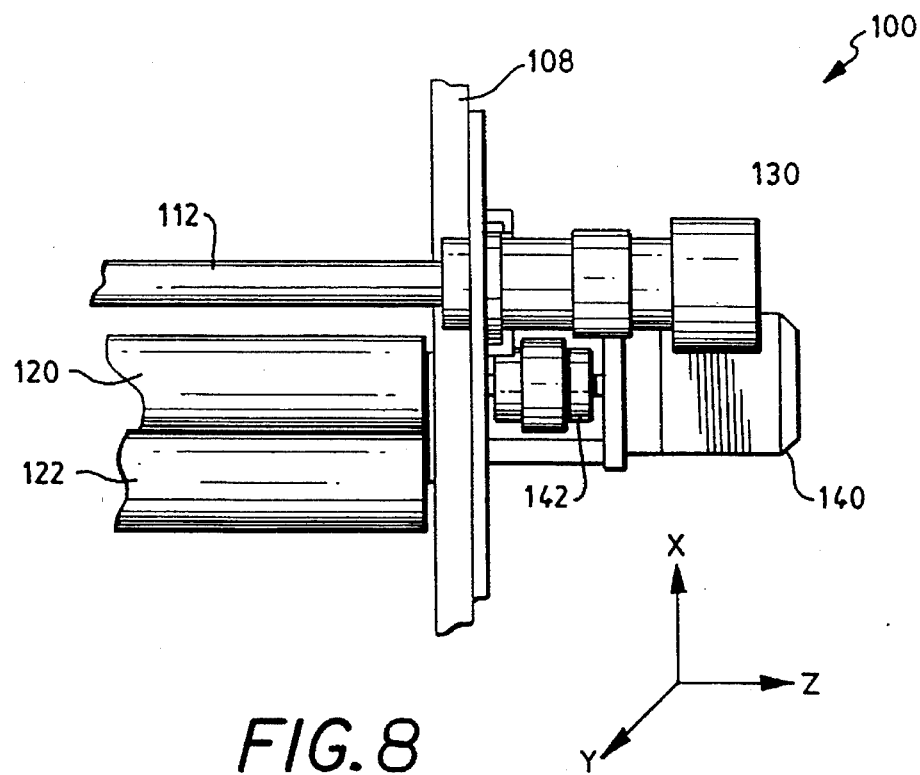
FIG. 8 is a partial top plan view of a drive and roller shaft arrangement used in a rewind assembly as incorporated into the laminator illustrated in FIG. 1 viewed along section E—E.

As shown in FIG. 1 and 8, spool assembly 100 is comprised of spool shaft 112 and a pair of abutting rubber rollers 120 and 122, the arrangement being supported in spool assembly housing 108. As shown in FIG. 8, spool shaft 112 is associated with brake 130 while rubber roller 120 is associated with rewind motor 140. In operation, a supply of web-borne protective overcoat is wound around spool shaft 112 and fed downstream toward the nip through abutting rollers 120 and 122. When the protective overcoat is desired for lamination, the supply is released by appropriately disengaging brake 130. In certain instances, it is desirable to rewind the web-borne protective overcoat (or the spent carrier web) back onto spool shaft 112. To this end, rewind motor 140 is provided with a clutch 142, the combination capable of being operated in association with brake 130 to urge reversed axial rotation of spool shaft 112.

It will be appreciated that without appropriate controls, tensioning of the protective overcoat will vary as the supply housed in spool assembly 100 is reduced during continued operation of laminator 1. It will be further appreciated that appropriate tensioning of the protective overcoat is important in preventing the protective overcoat from meandering as it is transported through the nip, the effects of which may cause jamming. Appropriate tensioning is also desirable to ensure that the protective overcoat enters the nip in a substantially flat state to prevent wrinkling and to promote contact (optical contact) with optical lamination roller 32 to make more consistent the formation of the activation zone by transmitted optical radiation. Further, lack of uniform tensioning may result in thickness deviations in the laminate which manifest as "ribbing" or curl.

Figure 7:
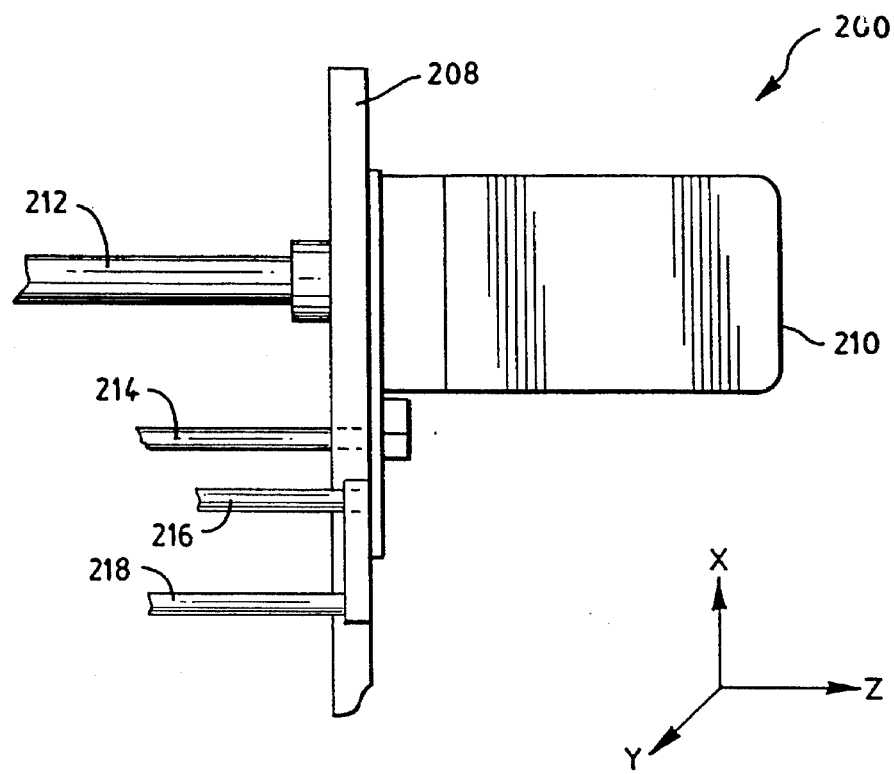
FIG. 7 is a partial top plan detail of a drive and roller shaft arrangement used in a take-up assembly as incorporated into the laminator illustrated in FIG. 1 viewed along section D—D.

To promote appropriate tensioning, spool assembly 100 is further provided with tensioning means comprising pivoting dancer bar 124 and extending bar 126. As shown in FIG. 1, pivoting dancer bar 124 is provided with a roller at a free end. Pivoting dancer bar 124 is capable of pivoting at an end opposite the free end to allow movement to a second position 124a. Extension bar 126 is provided with a roller at one end. At an opposite end, extension bar 126 is furnished with a guide 128, which provides for lateral movement of the extension bar relative to housing 108. Tensioning is controlled through these means by varying the relative locations of pivoting dancer bar 124 and extension bar 126, and thereby varying the distance through which the protective overcoat is transported. Analogous corresponding tensioning means are provided in take-up assembly 200. As shown in FIGS. 1 and 7, the corresponding tensioning means comprise pivoting dancer bar 224 (pivotable to position 224a) with guide roller 214 and extension bar 226 with guide roller 218.

As suggested above, the forward drive means for transporting the protective overcoat from spool assembly 100 into the nip is furnished by take-up assembly 200. As illustrated in FIGS. 1 and 7, take-up assembly 200 comprises take-up shaft 212, take-up shaft 212 being rotatably supported in take-up assembly housing 208 and cooperating in use with dancer roller 214, stripper roller 216 and extension bar roller 218. As shown in FIG. 7, take-up shaft 212 is rotationally driven by motor 210, which when activated allows the capture of spent carrier web. Forward driving force is generated by the ongoing winding of the carrier web around take-up shaft 212 during capture.

Figure 2:
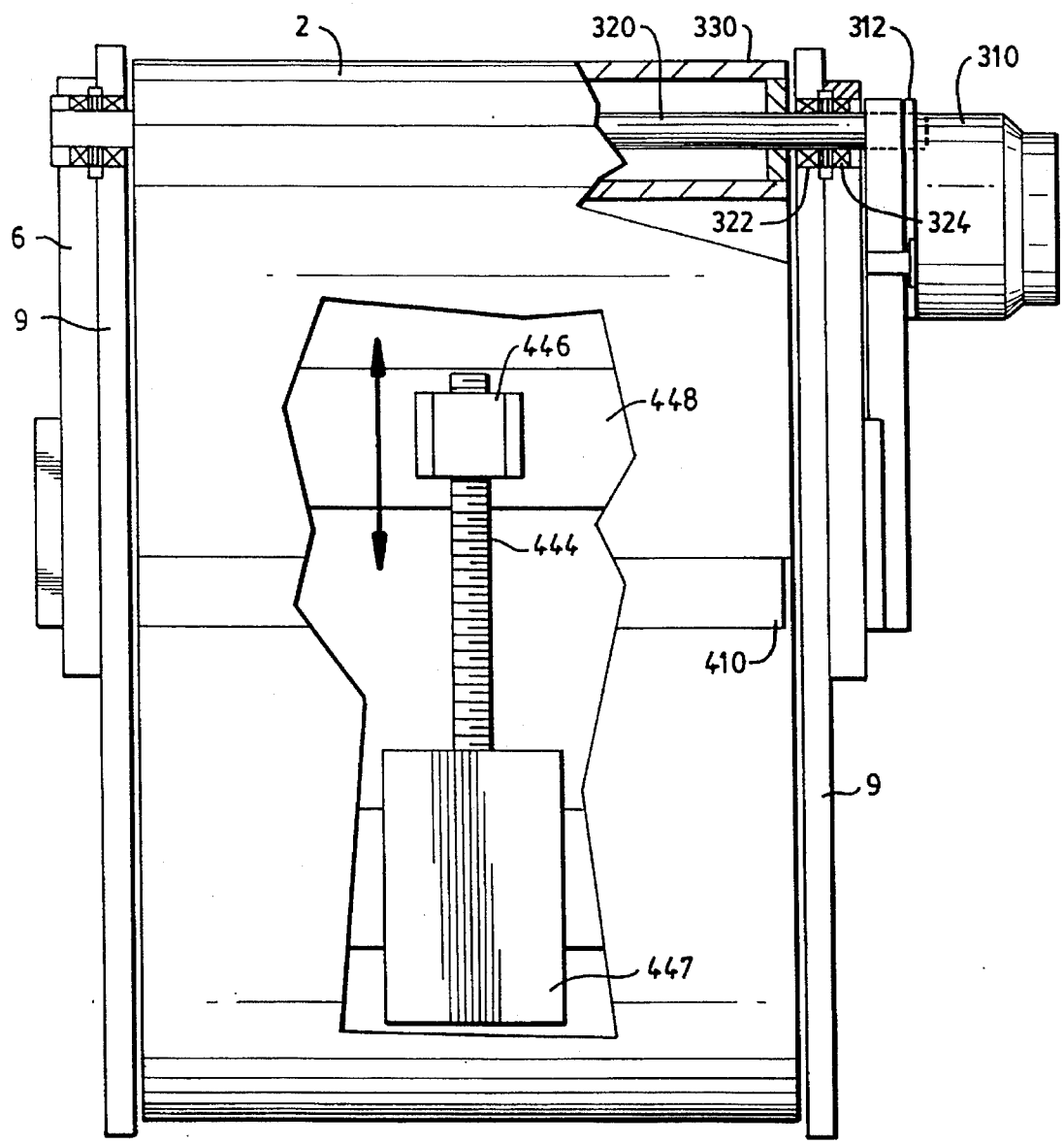
FIG. 2 is a bottom plan view of the optical laminator illustrated in FIG. 1 with partial cut-away views revealing cross-sectional detail of the laminator's continuous belt assembly frontal roller and compression inducing drive mechanism.
Figure 5:
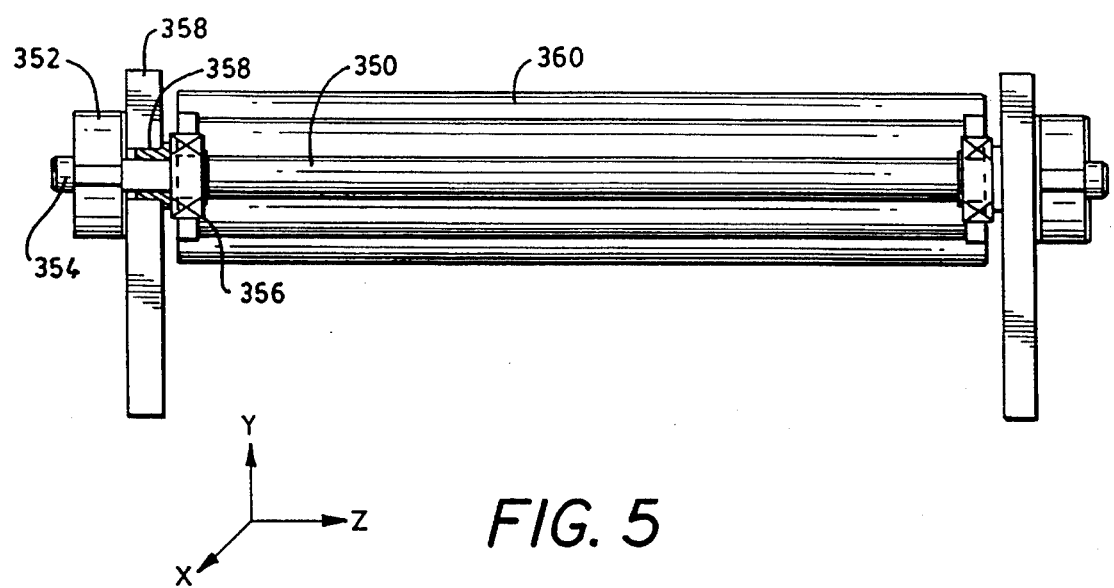
FIG. 5 is a rear lateral, cross-sectional view of a continuous belt assembly rear roller as incorporated into the laminator illustrated in FIG. 1 viewed along section A—A.

In substantial synchronicity with the transport of protective overcoat, during lamination, a receiving surface is conveyed into the nip by means of continuous belt assembly 300. As illustrated in FIGS. 1, 2, and 5, continuous belt assembly is comprised of an idler roller 360 and a drive roller 330 encircled by continuous belt 2. Drive roller 330 is rotatably mounted through side plate 9 by means of axle 320. Rotation is enhanced by the use of bearings 322 and 324. Drive roller shaft 320 extends past side plate 9 to contact motor 310, thereby providing means for generating rotational driving force to drive roller 330. Details and operation of continuous belt assembly 300, modifications and alternatives thereto, will be apparent to one skilled in the art in view of the present disclosure.

Configured in accordance with the embodiment described herein, the optical lamination system of the present invention is primarily directed to lamination processes employing protective overcoats capable of being made contiguously bondable to a receiving surface upon irradiation to optical radiation substantially at the point of irradiation. The term "contiguously bondable" is to be construed herein as the capacity to be bonded to an appropriate receiving surface that is compressively brought into contiguous, i.e., touching, association with the receiving surface. In accordance with such parameters, protective overcoats of various configurations may be employed successfully in the practice of the present invention. It will be appreciated that certain protective overcoat configurations may be employed usefully with certain types of optical radiation and not others. It will be further appreciated that a protective overcoat, in addition to providing important protective functionality, may serve also to impart to a receiving surface certain desired aesthetic or decorative effects. For example, in certain applications, it may be desirable to provide an overcoat with an imagewise dispersal or pattern of pigments or colorants. Lamination of such overcoat onto a receiving surface provides aesthetic functionality, aside from inherent protective functionality, such as in the lamination of a wood-patterned overcoat onto the surface of, for example, particle board. Several other functions exist and applications in fields other than imaging will generally vary depending upon the nature of the receiving surface and desired effects. Accordingly, the term "protective overcoat" should be given liberal construction.

In a specific, representative application of the present invention, a durable layer (cf., protective overcoat) is optically laminated onto the image surface (cf., receiving surface) of a developed thermal imaging media.

Figure 9:
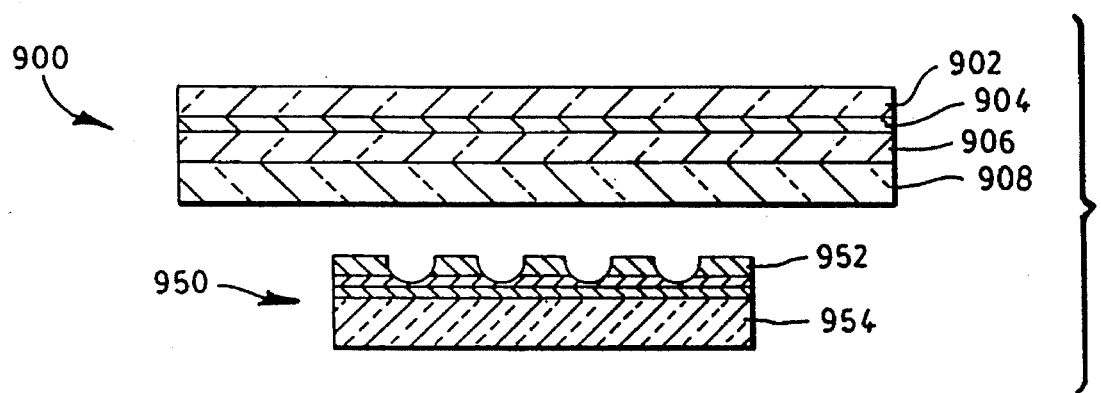
FIG. 9 is a schematic cross-sectional view of a laminating sheet and an imaged media having thereon an image surface prior to optical lamination.
Figure 10:
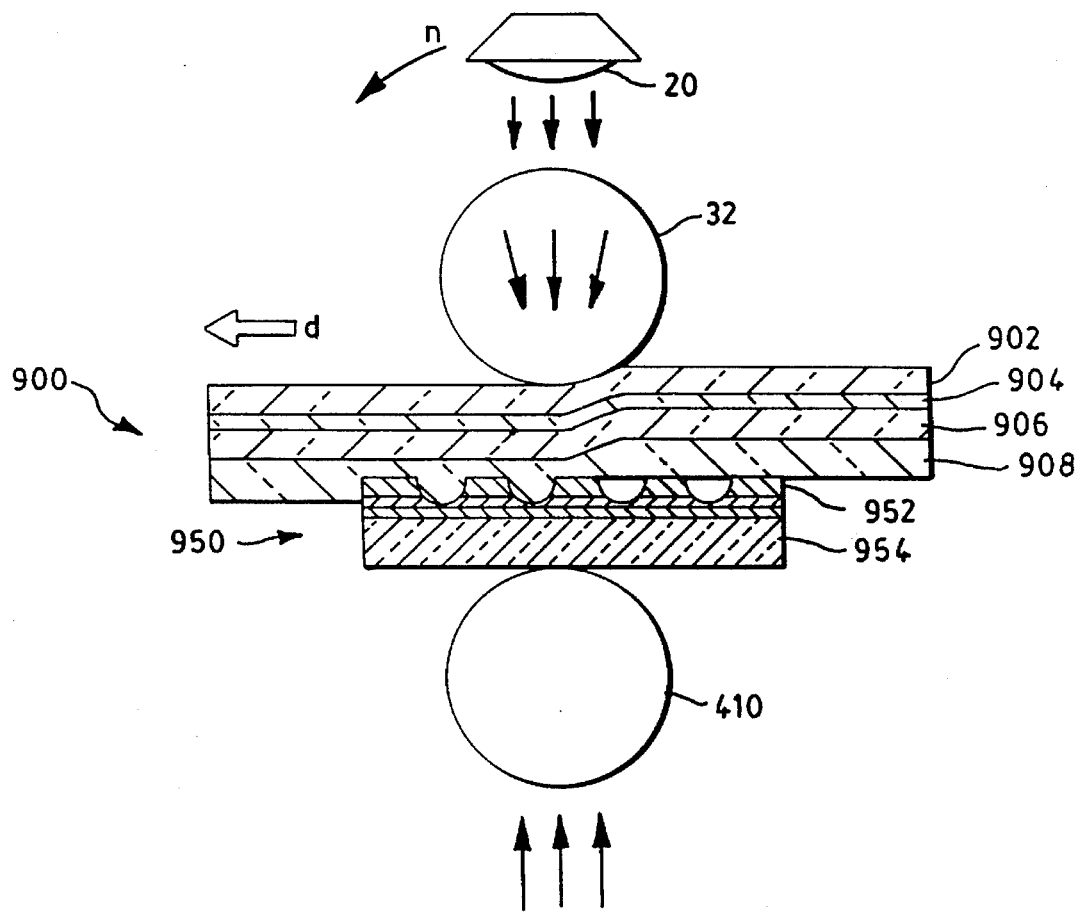
FIG. 10 is a schematic cross-sectional view of the laminating sheet and the imaged media of FIG. 9 during optical lamination.

FIG. 9 of the accompanying drawings shows in section a laminating sheet (generally designated 900) disposed over image media 950, the image media 950 having a binary image surface 950 formed on substrate 954. In addition to the aforementioned International Patent Application No. PCT/US87/03249 (Etzel), examples and methods of obtaining image media 950 may be extracted from the discussions provided in U.S. Pat. No. 5,155,003, issued to K. C. Chang on Oct. 13, 1992, and U.S. Pat. No. 5,200,297, issued to N. F. Kelly on Apr. 6, 1993. While these examples all relate to thermal imaging media wherein the receiving surfaces are porous or particulate image bearing surfaces developed by laminar separation, use of the present invention is not limited to developed thermal imaging media, but rather, can also be used advantageously for the protection of images prepared by resort to other known imaging methods, including those prepared by thermal dye transfer, ink jet, and laser ablation transfer methods. Even more generally, the present invention may be utilized for the lamination of any surface on which an optical lamination roller of the present invention may be rolled with an established, substantially uniform, linear nip.

Laminating sheet 900 comprises an adhesive layer 908, a durable layer 906, a release layer 904, and a support layer 902. As noted in aforementioned International Patent Application PCT/US91/08345 (Fehervari et al.), advantage is obtained when laminating sheet 900 is larger in both surface dimensions (i.e., length and width) than image media 950.

The durable layer 906 of the laminating sheet 900 may be formed from any material, such as a cured acrylic polymer, which confers the desired properties upon the durable layer formed on the image. For example, International Patent Application No. PCT/US91/08345 describes an embodiment wherein the durable layer is coated as a discontinuous layer from a latex which clears during lamination to produce a clear durable layer. As described, the durable layer comprised 80% by weight acrylic polymer, 10% by weight polyethylene/paraffin wax, and 10% by weight aqueous-based nylon binder, and was prepared by mixing the polymer and wax latices, adding the binder, then adding a silicone surfactant. In U.S. patent application Ser. No. 08/065,345, a durable layer is described as substantially transparent and comprising a polymeric organic material having therein incorporated a siloxane.

In general, it is preferred that the durable layer 906 when laminated over the binary imaged surface 952 of image media 950 not have a thickness greater than about 30μm, since thicker durable layers may, in some cases, cause optical problems in viewing the image due to internal reflections and/or refraction effects within the durable layer. Desirably, the thickness of the durable layer 906 does not exceed 10 μm, and more desirably this thickness is in the range of 2 to 6μm. The durable layer 906 should of course be resistant to materials with which it is likely to come into contact, including the materials which may be used to clean the protected imaged media. Although the exact materials which may contact the image will vary with the intended uses of the protected image media, in general it is desirable that the material for the durable layer 906 be substantially unchanged by contact with water, isopropanol and petroleum distillates. Preferably, the durable layer 906 should be resistant to any other materials with which it may come into contact, for example, accidental spills of coffee, which have a very deleterious effect on some plastics.

It will be appreciated that the protection of the imaged media 950 conferred by the durable layer 906 is increased when the durable layer 906 has high lubricity. Preferably, at least one of a wax, a solid silicone and silicone surfactant is included in the durable layer 906 to increase the lubricity of this layer.

Some durable layers can be satisfactorily laminated onto an image simply as results of thermal and compressive forces incident to optical lamination according to the present invention. Such durable layers are typically provided with a dye, colorant, or like compound incorporated therein having either actinic properties or capable of converting optical energy into thermal energy. When exposed to optical radiation, such durable layers are "activated" by the optical radiation so that they become bondable to desired receiving surfaces. When employing infrared radiation, such durable layer should preferably incorporate infrared dyes. It will be appreciated, however, that in general practice, it will be desirable to associate the durable layer 906 with an adhesive layer 904 (see below), and in such instances, the adhesive layer 908 may incorporate therein the dye, colorant, or like compound (see below).

The support layer 902 of the laminating sheet 900 may be formed from any material which can withstand the conditions which are required to laminate the laminating sheet 900 to the imaged media 950 and which is sufficiently coherent and adherent to the durable layer 906 to permit displacement of the support layer 902 away from the protected imaged media after lamination, with removal of those portion of the durable layer 906 which extend beyond the periphery of the substrate 954. For use in accordance with the present invention, the support layer 902 should be a plastic film substantially transparent to the optical radiation transmitted by optical radiation source 20. If desired, the support layer 902 may be treated with a subcoat or other surface treatment, such as those well-known to those skilled in the coating art, to control its surface characteristics, for example to increase or decrease the adhesion of the durable layer 906 or other layers (see below) to the support layer 902.

The laminating sheet 900 may comprise additional layers besides the durable layer 906 and support layer 902. For example, the laminating sheet 900 may comprise a release layer 904 interposed between the durable layer 906 and the support layer 902, this release layer 904 being such that, in the areas where the durable layer 906 remains attached to the image media 950, separation of the durable layer 906 from the support layer 902 occurs by failure within or on the surface of the release layer 904. As with the support layer 902, the release layer should be made from a material substantially transparent to the optical radiation transmitted by optical radiation source 20, preferably an optically transparent wax or silicone.

The laminating sheet may also comprise an adhesive layer 908 disposed on the surface of the durable layer 906 remote from the support layer 902 so that, during the lamination, the durable layer is adhered to the image surface by the adhesive layer 908. As suggested above, some durable layers can be satisfactorily laminated onto an image simply as a result of thermal and compressive forces incident to optical lamination according to the present invention. In other cases, however, the use of an adhesive layer 908 is desirable to achieve strong adhesion between the durable layer 906 and the imaged media 950, and/or to modify the activation energy needed for lamination. Various differing types of adhesive may be used to form the adhesive layer. For example, the adhesive layer 908 might be formed from a thermoplastic adhesive having a glass transition temperature in the range of about 120° C. (in which case, bondability is effected by the conductive heating of the adhesive layer above its glass transition temperature when adjacent areas of a suitable durable layer are optically activated). Alternatively, the adhesive layer 908 may be formed from a thermoplastic adhesive having a glass transition temperature in the range of about 120° C. and having incorporated therein a dye, colorant, or like compound capable of absorbing optical radiation (in which case, bondability is effected when the adhesive layer is locally heated above its glass transition temperature by the absorption of optical radiation by the dye, colorant, or like compound). Alternatively, the adhesive layer 908 might be formed of an infrared or ultraviolet curable adhesive (in which case, bondability is effected by exposing the adhesive to infrared or ultraviolet radiation, thereby curing the adhesive layer).

In the lamination of imaged media 950 in accordance with a method embodiment of the present invention, laminating sheet 900 and imaged media 950 are concurrently transported (in the direction of arrow d) into the nip between optical lamination roller 32 and resisting compression roller 410. While submitted to compressive forces between optical lamination roller 32 and resisting compression roller 410, laminating sheet 900 is irradiated with optical radiation at the nip, the optical radiation being emitted from optical radiation source 20 and thereafter transmitted and concentrated by optical lamination roller 32. An activation zone (of comparatively high activation energy) is thereby formed in the area of irradiation. The activation energy so produced effects, for example, adhesive flow from adhesive layer 908 in the area around the nip, which in cooperation with the compressive forces, effects the bonding of laminating sheet 900 to the imaged media 950 at the point of compression.

In typical practice, the laminating sheet 900 and imaged media 950 are uninterruptedly fed through the nip, irradiated and compressed such that the laminating sheet 900 is blanketwise bonded to the imaged media. It is envisioned, however, that for certain applications, discontinuous bonding may be more suitable. Additionally, as indicated above, the optical radiation source 20 may be moved in the direction of arrow n, for example, and the activation zone correspondingly shifted to an area upstream of the nip. Variations (and benefits thereof) in the location of optical radiation source 20 will be apparent to one skilled in the art in view of the present disclosure.

Figure 11:
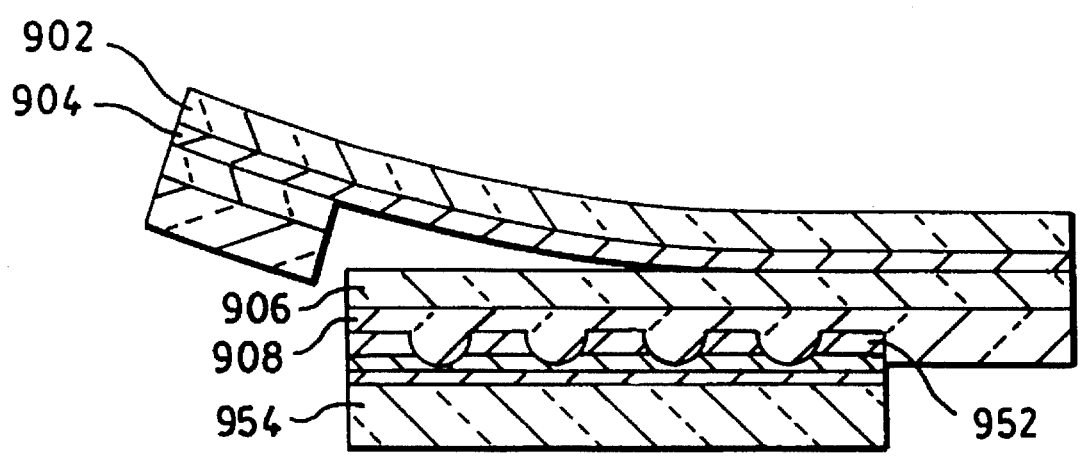
FIG. 11 is schematic cross-sectional view of a protected imaged media after optical lamination.

Subsequent to the desired bonding of laminating sheet 900 to imaged media 950, as shown in FIG. 11, the carrier web 902 (and release layer 904) is laminarly separated from the durable layer 906 adhered (by adhesive layer 908) to the imaged media 950. In the embodiment herein described, separation occurs downstream of the nip as the carrier web 902 (and release layer 904) is guided sharply around stripper roller 216, and the spent web captured by take-up assembly 200. Because the carrier web 902 (and release layer 904) is thinner and accordingly more flexible than the protected imaged media, the sharp bending of the carder web 902 (and release layer 904) causes it to mechanically peel away from the protected imaged media, resulting in a finished product.

We claim:

1. An optical laminator useful for substantially interfacially adhering a protective overcoat onto a receiving surface when the protective overcoat and receiving surface are continuously conveyed between an optical lamination roller and a source of resistance and wherein the protective overcoat is capable of being made bondable to the receiving surface upon irradiation with optical radiation, the optical laminator comprising an optical lamination roller positioned to establish a nip zone when brought into association with the resistance source, the optical lamination roller being axially rotatable and configured to transmit and concentrate optical radiation in the production of an activation zone;

conveying means for effectuating the positioning of the protective overcoat into the nip zone in optical contiguity with the optical lamination roller;

compressing means for generating a compressive force at the nip zone, the compressive force being of a magnitude sufficient to promote the adhering of the protective overcoat after exposure onto the receiving surface; and an optical radiation source capable of emitting optical radiation at an intensity sufficient to activate the protective overcoat when the optical radiation is transmitted and concentrated by the optical lamination roller; the optical radiation source capable of emitting optical radiation through the optical lamination roller.

2. The optical laminator of claim 1, wherein the optical radiation source is capable of emitting optical radiation through the optical lamination roller substantially toward the nip zone.

3. The optical laminator of claim 2, wherein the nip zone is substantially within the activation zone.

4. The optical laminator of claim 1, wherein the optical radiation emitted by the optical radiation source is infrared radiation; and the optical lamination roller is a substantially solid quartz roller.

5. The optical laminator of claim 1, further comprising a pressure roller, the pressure roller being the source of resistance, the pressure roller being axially rotatable and movable toward the optical lamination roller.

6. The optical laminator of claim 5, wherein the compressing means comprises urging means for pressurewise urging the pressure roller toward the optical lamination roller, whereby the nip zone is established.

7. The optical laminator of claim 6, further comprising bracing means for bracing the optical lamination roller when compressive force is generated at the nip zone, the bracing means comprising a first abutting roller and a second abutting roller, the first abutting roller frictionally abutting the optical lamination roller along a first width, the second abutting roller frictionally abutting the optical lamination roller along a corresponding second width.

8. An optical lamination process for adhering a protective overcoat onto a receiving surface, the optical lamination process comprising the steps of providing a protective overcoat capable of being made bondable to the receiving surface upon irradiation with optical radiation;

insertingly conveying a first region of the protective overcoat in substantial interfacial association with a first region of the receiving surface into a nip, the nip being established by an optical lamination roller brought into association with a resistance source, the optical lamination roller being axially rotatable and configured to transmit and concentrate optical radiation in the production of an activation zone;

bonding the first region of the protective overcoat to the first region of the receiving surface by
a) transmitting optical radiation through the optical lamination roller to irradiate the inserted first region of the protective overcoat, the transmission of the optical radiation establishing an activation zone on the protective overcoat wherein the protective overcoat becomes bondable to the receiving surface, and
b) generating compressive force in the nip to pressurewise urge the protective overcoat onto the receiving surface; and repeating the conveying, compressing, and bonding steps until the protective overcoat is adhered onto the receiving surface.

9. The process of claim 8, wherein the protective overcoat provided is a laminar structure comprising at least a substrate, a release layer, an adhesive layer and a durable layer.

10. The process of claim 8, wherein the transmitted optical radiation is infrared radiation and the optical lamination roller is a substantially solid quartz roller.

11. The process of claim 8, wherein the optical radiation is transmitted through the optical lamination roller substantially towards the nip.

12. The process of claim 11, wherein the nip is substantially within the activation zone.

13. An optical laminator useful for substantially interfacially adhering a protective overcoat onto a receiving surface when the protective overcoat and receiving surface are continuously conveyed between an optical lamination roller and a source of resistance and wherein the protective overcoat is capable of being made bondable to the receiving surface upon irradiation with optical radiation, the optical laminator comprising an optical lamination roller positioned to establish a nip zone at points along its cylindrical surface when brought into association with the resistance source, the optical lamination roller being substantially solid, axially rotatable, and configured to transmit optical radiation in the production of an activation zone;

conveying means for effectuating the positioning of the protective overcoat into the nip zone in optical contiguity with the optical lamination roller;

compressing means for generating a compressive force at the nip zone, the compressive force being of a magnitude sufficient to promote the adhering of the protective overcoat after exposure onto the receiving surface; and an optical radiation source capable of emitting optical radiation at an intensity sufficient to activate the protective overcoat when the optical radiation is transmitted through the optical lamination roller; the optical radiation source capable of emitting optical radiation through the optical lamination roller.

* * * * *